United States Patent
Wu (10) Patent No.: US 8,832,761 B2
(45) Date of Patent: Sep. 9, 2014

(54) METHOD AND APPARATUS FOR SERVICE CONFIGURATION CONVERSION IN DOSCIC-OVER-PON SYSTEM

(75) Inventor: Wei Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 498 days.

(21) Appl. No.: 12/951,417

(22) Filed: Nov. 22, 2010

(65) Prior Publication Data

US 2011/0131624 A1    Jun. 2, 2011

(30) Foreign Application Priority Data

Dec. 1, 2009   (CN) .......................... 2009 1 0246105

(51) Int. Cl.
    *H04N 7/173* (2011.01)
    *H04Q 11/00* (2006.01)
    *H04L 12/24* (2006.01)

(52) U.S. Cl.
    CPC ........ *H04L 41/0843* (2013.01); *H04Q 11/0067* (2013.01); *H04L 41/0803* (2013.01); *H04Q 11/0071* (2013.01); *H04L 41/0226* (2013.01)
    USPC .......................................... 725/111; 725/116

(58) Field of Classification Search
    CPC ............................................. H04N 217/17309
    USPC .................................................. 725/111, 116
    See application file for complete search history.

(56) References Cited

U.S. PATENT DOCUMENTS

| | | | | |
|---|---|---|---|---|
| 2007/0291777 A1* | 12/2007 | Jamieson et al. | ............. | 370/401 |
| 2008/0232801 A1* | 9/2008 | Arnold et al. | .................. | 398/58 |
| 2008/0310842 A1* | 12/2008 | Skrobko | ........................ | 398/72 |
| 2009/0003237 A1 | 1/2009 | Liu et al. | | |
| 2009/0103918 A1* | 4/2009 | Tsuge et al. | .................... | 398/45 |
| 2011/0069953 A1* | 3/2011 | Bronstein et al. | ............... | 398/45 |
| 2011/0078755 A1* | 3/2011 | Dai | ............................... | 725/111 |

FOREIGN PATENT DOCUMENTS

CN    1855837 A    11/2006

OTHER PUBLICATIONS

Office Action issued in corresponding Chinese Patent Application No. 200910246105.4, mailed Aug. 28, 2012.
Bernstein et al., "A Proposal for DOCSIS 4.0: The Best of DOCSIS and PON" Communications Technology, Feb. 1, 2008.

* cited by examiner

*Primary Examiner* — Hunter B Lonsberry (74) *Attorney, Agent, or Firm* — Brinks Gilson & Lione (57) ABSTRACT

A method for configuration conversion includes: switching a working mode to a virtual Cable Modem (CM) mode according to a virtual mode switching notification message sent by an Optical Line Terminal (OLT); obtaining first configuration information from an Operations Support System (OSS), the first configuration information being DOCSIS-based configuration information; converting the first configuration information into second configuration information, the second configuration information being PON-based configuration information; implementing local parameter configuration according to the PON-based second configuration information; and sending a configuration complete message to the OLT after the configuration is complete. With the present disclosure, a performance bottleneck problem that might otherwise exist within the OLT art can be solved, and a service provisioning efficiency can be improved.

20 Claims, 7 Drawing Sheets

Figure 1:
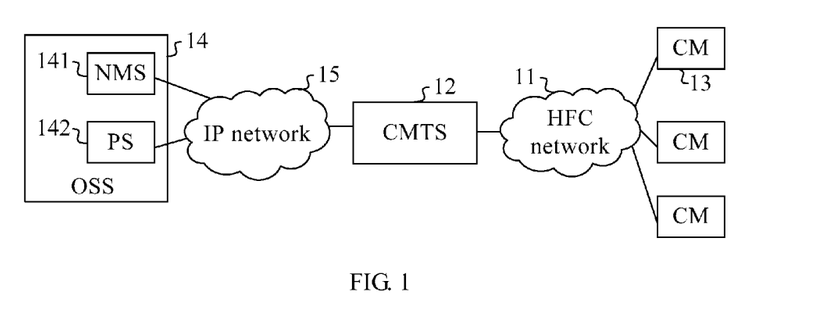
FIG. 1 illustrates a structure of a DOCSIS network.

FIG. 8 ically, the NMS 141 may include a log server and a Simple Network Management Protocol (SNMP) server. The PS 142 may include a Dynamic Host Configuration Protocol (DHCP) server, a Trivial File Transfer Protocol (TFTP) server, and a Time of Day (ToD) server.

METHOD AND APPARATUS FOR SERVICE CONFIGURATION CONVERSION IN DOSCIC-OVER-PON SYSTEM

CROSS-REFERENCE TO RELATED APPLICATION

This application claims priority to Chinese Patent Application No. CN200910246105.4, filed on Dec. 1, 2009, which is hereby incorporated by reference in its entirety.

FIELD OF THE DISCLOSURE

The present invention relates to communication technology, and in particular, to methods and apparatus for service configuration conversion in a DOSCIC-over-PON system.

BACKGROUND

Passive Optical Network (PON) technology is a point-to-multipoint optical fiber access technology. A PON system includes an Optical Line Terminal (OLT) on the central office side (also referred to as the network side), an Optical Distribution Network (ODN), and a plurality of optical network units (ONUs) or Optical Network Terminals (ONTs) on the user side. Data Over Cable Service Interface Specifications (DOCSIS) define a bidirectional interactive broadband network that is constructed on a basis of the Cable Television (CATV) Hybrid Fiber Coaxial (HFC) network. The DOCSIS can fully make use of existing coaxial cable resources of the CATV based on a traditional analog transmission mode, and thus, services such as voice services, video services, and data services can be provided for users without necessity of reconstructing other networks.

In existing DOSCIC-over-PON technology, a PON system accesses the network by acting as virtual cable, and an independent server (i.e., a DOCSIS proxy server) is utilized to translate DOCSIS-based protocols including quality of service (QoS), security, terminal registration and authentication, and terminal service provisioning protocols to relevant PON-based protocols, such that the PON system is enabled to support DOCSIS-based service provisioning and Operations Support System (OSS).

However, such independent server is required to process configuration files of the ONUs/ONTs in a centralized manner. This may induce a performance bottleneck problem upon a condition that a great number of ONUs/ONTs exist in the network, and therefore, a service provisioning time of the ONUs/ONTs is affected.

BRIEF DESCRIPTION OF THE DRAWINGS

To make the technical solution under the present invention clearer, the accompanying drawings for illustrating the embodiments of the present invention are outlined below. Apparently, the accompanying drawings are exemplary only, and persons having ordinary skills in the art can derive other drawings from such accompanying drawings without any creative effort.

DETAILED DESCRIPTION OF THE EMBODIMENTS

The technical solution under the present invention is described below with reference to accompanying drawings. Evidently, the embodiments described below are exemplary only, without covering all embodiments of the present invention. All other embodiments, which can be derived by those skilled in the art from the embodiments given herein without any creative efforts, fall within the scope of the present invention.

FIG. 1 illustrates a structure of a DOCSIS network. As shown in FIG. 1, the DOCSIS network includes an HFC network 11, a Cable Modem Termination System (CMTS) 12, a plurality of Cable Modems (CMs) 13, an OSS 14, and an Internet Protocol (IP) network 15. The CMTS 12 is a central office network data access device. The CMTS 12 serves as a connection device between the IP network 15 and the HFC network 11, and is mainly configured for implementing functions including network data forwarding, protocols processing, and radio frequency modulation and demodulation, etc. The CM 13 connects the HFC network 11 and user terminals, and is mainly configured for implementing functions including data forwarding between the HFC network 11 and user data networks (or data devices), protocols processing, and modulation and demodulation, etc. The OSS 14 may include a Network Management System (NMS) 141 and a Service Provisioning System (PS) 142. Generally, the NMS 141 may include a log server and a Simple Network Management Protocol (SNMP) server. The PS 142 may include a Dynamic Host Configuration Protocol (DHCP) server, a Trivial File Transfer Protocol (TFTP) server, and a Time of Day (ToD) server.

Figure 2:
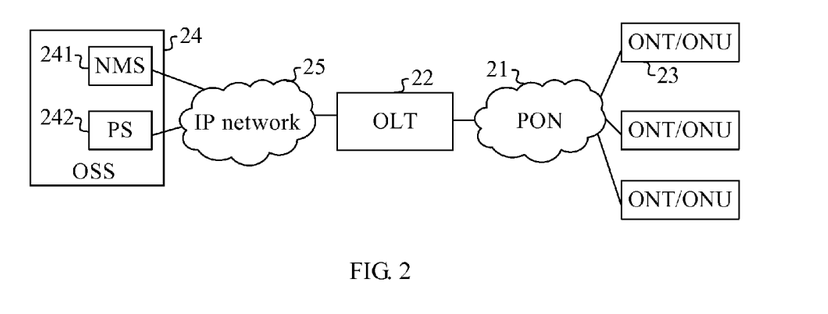
FIG. 2 illustrates a structure of an applicable network system according to an embodiment of the present disclosure.

FIG. 2 illustrates a structure of an applicable network system according to an embodiment of the present disclosure. As shown in FIG. 2, the network system is a DOCSIS-over-PON system, and includes a PON 21, an OLT 22, a plurality of ONTs/ONUs 23, an OSS 24, and an IP network 25.

The OLT 22 is a central office network data access device. The OLT 22 serves as a connection device between the IP network 25 and the PON 21, and is mainly configured for implementing functions including network data forwarding, protocols processing, and radio frequency modulation and demodulation. The ONT/ONU 23 connects the PON 21 and user terminals, and is mainly configured for data forwarding between the PON 21 and user data networks (or data devices), protocols processing, and modulation and demodulation. The OSS 24 may be an OSS supporting DOCSIS service provisioning. The OSS 24 may include an NMS 241 and a PS 242. In the system architecture as shown in FIG. 2, the OLT 22 and the ONTs/ONUs 23 may simulate the CMTS and the CM in the DOCSIS network architecture, and implement services processing.

With the foregoing system architecture, the OSS can remain unchanged when a CATV operator constructs the PON, so that the CATV operator can extend dense fiber networks to a so-called "last mile", without necessities of modifying the user configuration as well as the management system. Thus, a maintenance cost of the operator can be reduced considerably, and the HFC network can be upgraded to the PON easily.

The methods and apparatus for service configuration conversion in a DOCSIS-over-PON system provided in embodiments of the present disclosure are described in detail below with reference to specific implementation.

Figure 3:
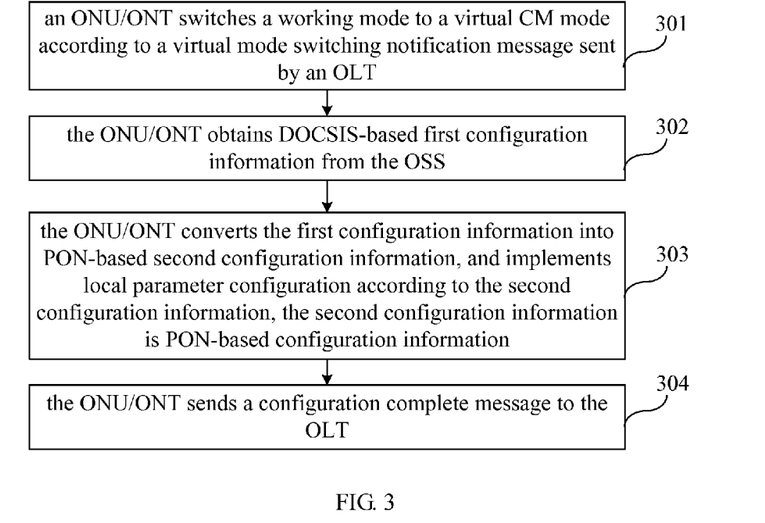
FIG. 3 illustrates a flowchart of a method for service configuration conversion according to an embodiment of the present disclosure.

FIG. 3 illustrates a flowchart of a method for service configuration conversion in a DOCSIS-over-PON system according to an embodiment of the present disclosure. As shown in FIG. 3, the method includes the following steps:

Step 301: An ONU/ONT switches a working mode to a virtual CM mode according to a virtual mode switching notification message sent by an OLT.

Step 302: The ONU/ONT obtains DOCSIS-based first configuration information from the OSS.

Step 303: The ONU/ONT converts the first configuration information into PON-based second configuration information, and implements local parameter configuration (i.e., configures parameters of the ONU/ONT) according to the second configuration information, the second configuration information is PON-based configuration information.

Step 304: The ONU/ONT sends a configuration complete message to the OLT.

With the method for service configuration conversion in a DOCSIS-over-PON system according to the embodiment of the present disclosure, the ONU/ONT converts the DOCSIS-based first configuration information into the PON-based second configuration information, so that the OLT is enabled to perform service provision according to the second configuration information, without the necessities of modifying the existing OSS. Because the first configuration information is converted into the second configuration information by the ONU/ONT, the performance bottleneck that might otherwise occurs within the OLT, due to the necessities of performing configuration information conversions (i.e., converting the first configuration information into the second configuration information) for a great number of ONTs/ONUs in a centralized manner by the OLT, can be overcome. In addition, because the ONU/ONT obtains the DOCSIS-based first configuration information from the OSS directly, a service provisioning efficiency of a PON terminal can be improved.

Figure 4:
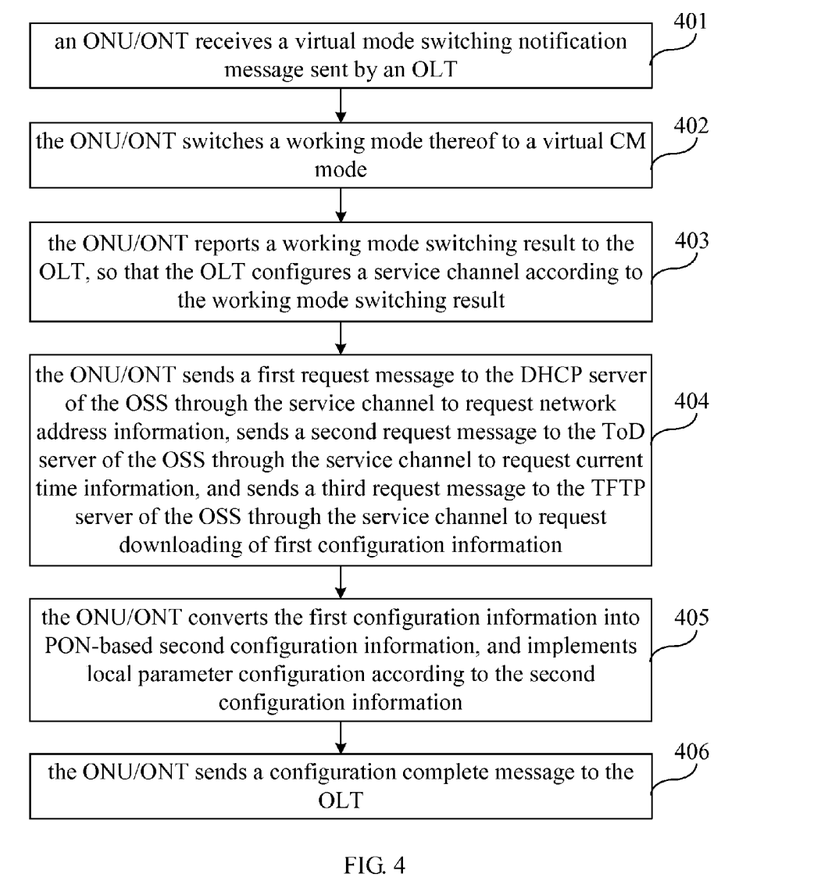
FIG. 4 illustrates a flowchart of a method for service configuration conversion according to another embodiment of the present disclosure.

FIG. 4 illustrates a flowchart of a method for service configuration conversion according to another embodiment of the present invention. As shown in FIG. 4, the method includes the following steps:

Step 401: An ONU/ONT receives a virtual mode switching notification message sent by an OLT.

The OLT instructs the ONU/ONT to work in a virtual CM mode through the virtual mode switching notification message. The virtual mode switching notification message can be provided by extending an existing PON management protocol. Specifically, the virtual mode switching notification message can be obtained, for an OLT of the Ethernet Passive Optical Network (EPON), by extending an Operation, Administration and Maintenance (OAM) message. The extended OAM message can serve as the virtual mode switching notification message, which is a type of virtual CM mode configuration messages, and is illustrated in Table 1.

TABLE 1

Virtual CM Configuration Message

| Content | Description |
|---|---|
| DA = 01-80-C2-00-00-02 | Destination MAC address |
| SA | Source MAC address |
| Length/Type = 0x8809 | Type code |
| Subtype = 0x03 | Slow protocol |
| Flags | Including the state bit |
| Code = 0xFE | Fixed value 0xFE |
| OUI | |
| Ext. Opecod = 0x03 | Extension operation code: a value 0x3 indicates that an OLT configures an extension attribute on an ONU. |
| Branch = 0xC7 | Extension attribute: a value 0xC7 indicates the Get/Set operation |
| Leaf = 0x000A | Leaf code: a value 0x000A indicates configuration of a working mode of an ONU/ONT. |
| Variable Width | Variable length |
| Action | 0x00: ONU/ONT mode 0x01: virtual CM mode |
| Pad | Padding byte: ensuring that the minimum frame length is 64 bytes |
| FCS | Frame check sequence |

According to Table 1, an extended OAM message is a new provided OAM message, which is adapted to modify the working mode of the ONU/ONT.

The virtual mode switching notification message by be obtained, for an OLT of the Gigabit Passive Optical Network (GPON), by extending an ONU Management and Control Interface (OMCI) message. In an exemplary embodiment, the OMCI message may be extended by adding a virtual CM attribute to an existing ONT-G management entity. The virtual CM attribute indicates whether the ONU/ONT works in virtual CM mode (in bytes), with a value "0" indicating that the ONU/ONT works in ONU/ONT mode, while a value "1" indicating that the ONU/ONT works in virtual CM mode. In addition, the virtual CM attribute supports reading and writing.

Step 402: The ONU/ONT switches a working mode thereof to a virtual CM mode.

After the ONU/ONT receives the virtual mode switching notification message instructing the ONU/ONT to work in the virtual CM mode, in one embodiment, the ONU/ONT may firstly determine whether it supports the virtual CM mode. If the ONU/ONT supports the virtual CM mode, the ONU/ONT switches the working mode thereof to the virtual CM mode. In an alternative embodiment, the system is provided with ONUs/ONTs supporting the virtual CM mode, with such configuration, upon receiving the virtual mode switching notification message, the ONU/ONT can switch the working mode thereof to the virtual CM mode directly.

Step 403: The ONU/ONT reports a working mode switching result to the OLT, so that the OLT configures a service channel according to the working mode switching result.

The ONU/ONT reports a result of the working mode switching process to the OLT. For example, the ONU/ONT may report the working mode switching result to the OLT by use of an extended EPON OAM message or an extended GPON OMCI message. In an exemplary embodiment, the working mode switching result may be a message indicating that the ONU/ONT has switched the working mode thereof to the virtual CM mode, or a message indicating that the ONU/ONT does not support the virtual CM mode.

Step 404: The ONU/ONT sends a first request message to the DHCP server of the OSS through the service channel to request network address information, sends a second request message to the ToD server of the OSS through the service channel to request current time information, and sends a third request message to the TFTP server of the OSS through the service channel to request downloading of first configuration information.

For example, the ONU/ONT may simulate a CM, and send corresponding request messages to the servers of the OSS through the service channel. Moreover, the network address information requested by the ONU/ONT from the DHCP server may include an IP address, the address of an OSS server, and a name of the configuration file.

Step 405: The ONU/ONT converts the first configuration information into PON-based second configuration information, and implements local parameter configuration (i.e., configures relevant parameters of the ONU/ONT) according to the second configuration information.

The first configuration information obtained by the ONU/ONT from the OSS is a DOCSIS-based configuration file. To enable the ONU/ONT to work normally after the working mode of the ONU/ONT is switched to the virtual CM mode, the ONU/ONT needs to be configured according to the configuration file provided by the OSS. Generally, the ONU/ONT is a network device that operates based on the PON protocols. Because the first configuration information is DOCSIS-based configuration information, the ONU/ONT would convert the DOCSIS-based first configuration information into PON-based second configuration information, and then configures local parameters (i.e., the parameters of the ONU/ONT) according to the second configuration information.

The first configuration information may include an identifier (ID) of a service flow and corresponding service type information of the service flow. In the presented embodiment, a conversion relation between the DOCSIS protocol and the PON protocol is described in Table 2. The conversion relation may be pre-configured in the ONU/ONT, and the ONU/ONT can convert the DOCSIS-based first configuration information to the PON-based second configuration based on the conversion relation.

tion, so that the OLT is enabled to perform service provision according to the second configuration information, without the necessities of modifying the existing OSS. Because the configuration information conversion is completed by each ONU/ONT, the performance bottleneck problem, which might otherwise occur within the OLT upon a condition that the network system includes a great number of ONUs/ONTs, can be solved efficiently. In addition, because the ONU/ONT obtains the DOCSIS-based first configuration information from the OSS directly, the service provisioning efficiency of a PON terminal can be further improved.

Furthermore, before the method embodiments as shown in FIG. 3 and FIG. 4 being implemented, registration at the PON physical layer needs to be performed between the ONUs/ONTs and the OLT. Details about the registration process can be referred to that defined in the GPON standard or that defined in the EPON standard.

Figure 5:
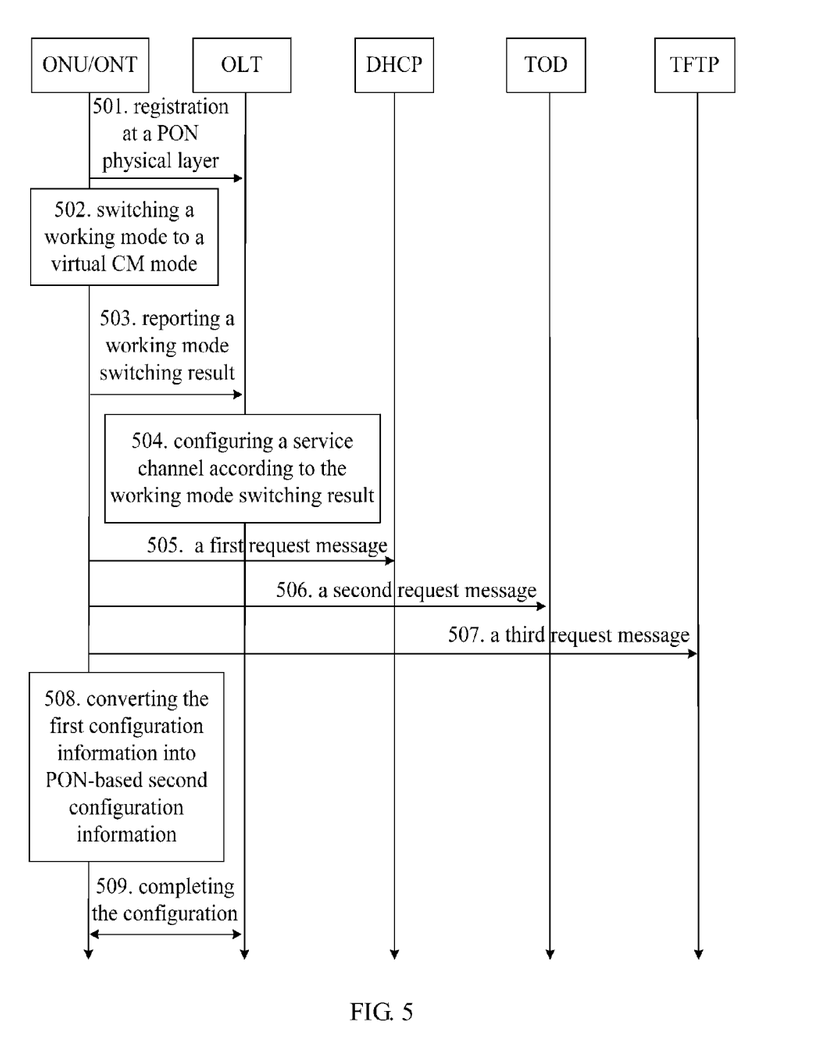
FIG. 5 illustrates a signaling diagram of a method for service configuration conversion according to an embodiment of the present disclosure.

FIG. 5 illustrates a signaling diagram of a method for service configuration conversion according to an embodiment of the present invention. In the illustrated embodiment, an ONU/ONT, an OLT, a DHCP server, a ToD server, and a TFTP server are taken as examples, where the DHCP server, the ToD server, and the TFTP server are all servers within an OSS. As shown in FIG. 5, the method includes the following steps:

Step 501: Registration at the PON physical layer is performed between the ONU/ONT and the OLT.

Details about the registration process between the ONU/ONT and the OLT can be referred to that defined in the GPON standard or that defined in the EPON standard.

Step 502: The ONU/ONT switches a working mode thereof to a virtual CM mode according to an notification sent by the OLT.

Step 503: The ONU/ONT reports a working mode switching result to the OLT.

Step 504: The OLT configures a service channel for the ONU/ONT according to the working mode switching result.

Step 505: The ONU/ONT sends a first request message to the DHCP server of the OSS through the service channel to obtain network address information.

TABLE 2

| Configuration Information | DOCSIS | GPON | EPON |
|---|---|---|---|
| ID of uplink service flow | SID (ID of Service Flow) | Alloct-ID (Transport Container ID, T-CONT ID) | LLID (Logical Link ID) |
| Service type of uplink service flow | UGS (Unsolicited Grant Service) | Fixed (Fixed bandwidth) | Fixed (Fixed bandwidth) |
| Service type of uplink service flow | UGS-AD (Unsolicited Grant Service with Activity Detection) | Fixed (Fixed bandwidth) | Fixed (Fixed bandwidth) |
| Service type of uplink service flow | Rt-Polling (Real-Time Polling Service) | Assured (Assured bandwidth) | Assured (Assured bandwidth) |
| Service type of uplink service flow | Nrt-Polling (Non-Real-Time Polling Service) | Non-assured (Non-assured bandwidth) | Best-effort delivery |

Step 406: The ONU/ONT sends a configuration complete message to the OLT.

With the method for service configuration conversion in the DOCSIS-over-PON system according to the embodiment of the present disclosure, the ONU/ONT converts the DOCSIS-based first configuration information into the PON-based second configuration information, and implements local parameter configuration (i.e., configures parameters of the ONU/ONT) according to the second configuration informa- Step 506: The ONU/ONT sends a second request message to the ToD server of the OSS through the service channel to obtain current time information.

Step 507: The ONU/ONT sends a third request message to the TFTP server of the OSS through the service channel to request downloading of first configuration information, the first configuration information is DOCSIS-based configuration information.

Step 508: The ONU/ONT converts the first configuration information into PON-based second configuration information.

Step 509: The ONU/ONT implements local parameter configuration according to the second configuration information, and sends a configuration complete message indicating that the configuration is complete to the OLT.

With the method for service configuration conversion in the DOCSIS-over-PON system according to the embodiment of the present disclosure, the ONU/ONT converts the DOCSIS-based first configuration information into the PON-based second configuration information, and implements local parameter configuration (i.e., configures parameters of the ONU/ONT) according to the second configuration information, so that the OLT is enabled to perform service provision according to the second configuration information, without the necessities of modifying the existing OSS. Because the configuration information conversion is completed by each ONU/ONT, the performance bottleneck problem, which might otherwise occurs within the OLT upon a condition that the network system includes a great number of ONUs/ONTs, can be solved efficiently. In addition, because the ONU/ONT obtains the DOCSIS-based first configuration information from the OSS directly, the service provisioning efficiency of a PON terminal can be further improved.

Furthermore, in the embodiments as shown in FIG. 3 to FIG. 5, the first configuration information may be configuration management command information defined in the DOCSIS protocol, and the second configuration information may be configuration management command information defined in the PON protocol.

Figure 6:
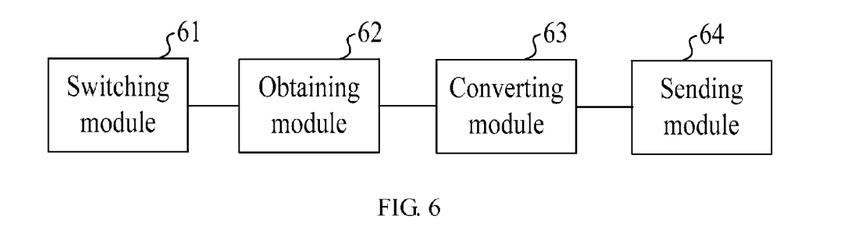
FIG. 6 illustrates a structure of a service configuration conversion apparatus according to an embodiment of the present disclosure.

According to the foregoing methods for service configuration conversion, embodiments of the present disclosure further provide a service configuration conversion apparatus. FIG. 6 illustrates a structure of a service configuration conversion apparatus according to an embodiment of the present disclosure. The service configuration conversion apparatus may be an ONT/ONU. As shown in FIG. 6, the service configuration conversion apparatus includes a switching module 61, an obtaining module 62, a converting module 63, and a sending module 64.

The switching module 61 is configured to switch a working mode of the service configuration conversion apparatus to a virtual CM mode according to a virtual mode switching notification message sent by an OLT.

The obtaining module 62 is configured to obtain DOCSIS-based first configuration information from the OSS.

The converting module 63 is configured to convert the first configuration information into PON-based second configuration information, so that the service configuration conversion apparatus can implement local configuration (i.e., configure relevant parameters thereof) according to the second configuration information.

The sending module 64 is configured to send a configuration complete message to the OLT after the service configuration conversion apparatus completes the configuration.

Figure 7:
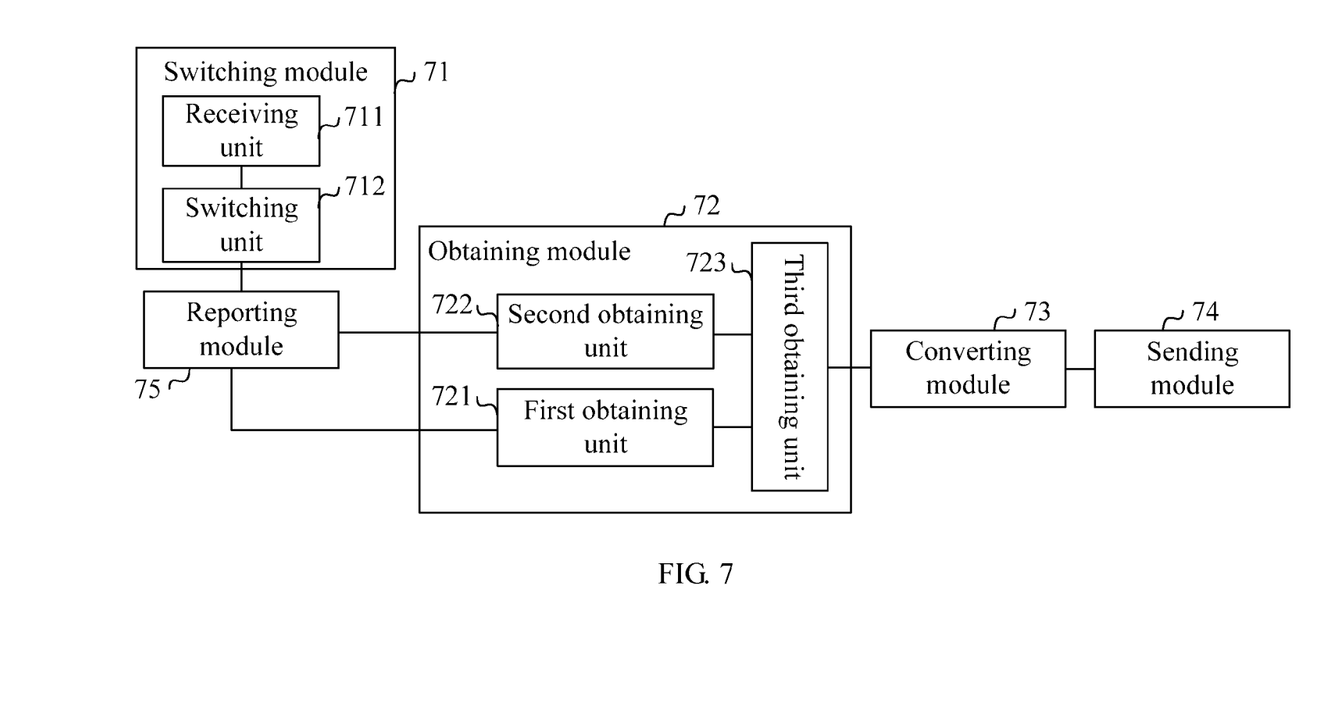
FIG. 7 illustrates a structure of a service configuration conversion apparatus according to another embodiment of the present disclosure.

FIG. 7 illustrates a structure of a service configuration conversion apparatus according to another embodiment of the present disclosure. As shown in FIG. 7, the service configuration conversion apparatus includes a switching module 71, an obtaining module 72, a converting module 73, a sending module 74, and a reporting module 75.

The switching module 71 is configured to switch a working mode of the service configuration conversion apparatus to a virtual CM mode according to a virtual mode switching notification message sent by an OLT.

The obtaining module 72 is configured to obtain DOCSIS-based first configuration information from the OSS.

The converting module 73 is configured to convert the first configuration information into PON-based second configuration information, so that the service configuration conversion apparatus can implement local configuration (i.e., configure relevant parameters thereof) according to the second configuration information.

The sending module 74 is configured to send a configuration complete message to the OLT after the service configuration conversion apparatus completes the configuration.

The reporting module 75 is configured to report a working mode switching result to the OLT, so that the OLT configures a service channel according to the working mode switching result.

Furthermore, the switching module 71 may include a receiving unit 711 and a switching unit 712. The receiving unit 711 receives a virtual mode switching notification message sent by an OLT. If the virtual CM mode is supported by the service configuration conversion apparatus, the switching unit 712 switches a working mode of the service configuration conversion apparatus to the virtual CM mode.

Furthermore, the obtaining module 72 may include a first obtaining unit 721, a second obtaining unit 722, and a third obtaining unit 723. The first obtaining unit 721 sends a first request message to a DHCP server of the OSS through the service channel to obtain network address information. The second obtaining unit 722 sends a second request message to a ToD server of the OSS through the service channel to obtain current time information. The third obtaining unit 723 sends a third request message to a TFTP server of the OSS through the service channel to request downloading of first configuration information.

In the service configuration conversion apparatus provided in the embodiment of the present disclosure, the converting module 73 converts the DOCSIS-based first configuration information into the PON-based second configuration information, so that the service configuration conversion apparatus can Implements local parameter configuration according to the second configuration information, and the OLT is enabled to perform service provision according to the second configuration information. Because the configuration information conversion is completed by the service configuration conversion apparatus, a utilization of the service configuration solve the performance bottleneck problem which might otherwise occurs within the OLT efficiently. In addition, because the service configuration conversion apparatus obtains the DOCSIS-based first configuration information from the OSS directly, the service provisioning efficiency of a PON terminal can be further improved.

Figure 8:
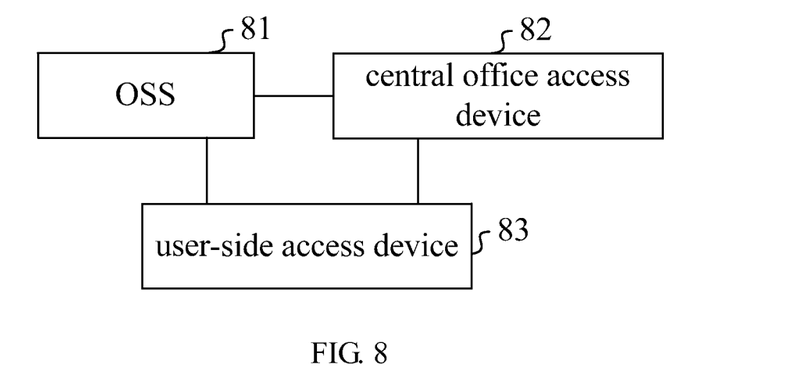
FIG. 8 illustrates a structure of a system for service configuration conversion according to an embodiment of the present disclosure.

Furthermore, embodiments of the present disclosure also provide a system for service configuration conversion. FIG. 8 illustrates a structure of a system for service configuration conversion according to an embodiment of the present disclosure. As shown in FIG. 8, the system for service configuration conversion includes an OSS 81, a central office access device 82, and a user-side access device 83.

The OSS 81 may be an OSS supporting DOCSIS service provisioning, which is configured to provide DOCSIS-based configuration information (hereinafter referred to as first configuration information).

The central office access device 82 may be an OLT, which is connected to the OSS 81 through an IP network and connected to the user-side access device 83 through a PON. The central office access device 82 is configured to configure a service channel (for the user-side access device 83) and perform service provision for the user-side access device 83.

The user-side access device 83 may be an ONU/ONT, which may be the service configuration conversion apparatus as shown in FIG. 6 or FIG. 7.

Specifically, the user-side access device 83 is configured to: receive a virtual mode switching notification message sent by the central office access device 82, switch a working mode thereof to a virtual CM mode according to the virtual mode switching notification message, obtain DOCSIS-based first configuration information provided by the OSS 81, convert the first configuration information into PON-based second configuration information, and implement local parameter configuration (i.e., configure relevant parameters thereof) according to the second configuration information.

In the system for service configuration conversion according to the embodiment of the present disclosure, the user-side access device 83 converts the DOCSIS-based first configuration information into the PON-based second configuration information, so that local parameters of the user-side access device 83 can be configured according to the second configuration information, and the central office access device 82 can perform service provision according to the second configuration information. Because the configuration information conversion is completed by the user-side access device 83, the system for service configuration conversion system can solve the performance bottleneck problem which might otherwise occurs within the OLT efficiently. In addition, because the service configuration conversion system obtains the DOCSIS-based first configuration information from the OSS 81 directly, the service provisioning efficiency of a PON terminal can be further improved.

Persons of ordinary skills in the art may understand that all or part of the steps of the method according to the embodiments of the present invention may be implemented by a program instructing relevant hardware. The program may be stored in a computer readable storage medium. The storage medium may be a magnetic disk, a Read Only Memory (ROM) or a Random Access Memory (RAM), or a Compact Disk-Read Only Memory (CD-ROM).

It should be noted that the above embodiments are merely provided for describing the technical solution of the present invention, but not intended to limit the present invention. Although the present invention has been described in detail with reference to the foregoing embodiments, it is apparent that those skilled in the art can make various modifications and variations to the invention without departing from the spirit and scope of the present invention. The invention shall cover the modifications and variations provided that they fall within the scope of protection defined by the following claims or their equivalents.

What is claimed is:

1. A method for service configuration conversion in a Data Over Cable Service Interface Specifications over Passive Optical Network (DOCSIS-over-PON) system, comprising:
   switching by an Optical Network Unit or Optical Network Terminal (ONU/ONT), a working mode to a virtual Cable Modem (CM) mode according to a virtual mode switching notification message sent directly by an Optical Line Terminal (OLT);
   obtaining by the ONU/ONT, DOCSIS-based configuration information directly from an Operations Support System (OSS);
   converting by the ONU/ONT, the DOCSIS-based configuration information into PON-based configuration information;
   implementing by the ONU/ONT, local parameter configuration according to the PON-based configuration information; and
   sending by the ONU/ONT, a configuration complete message directly to the OLT after the configuration is complete.

2. The method of claim 1, wherein the DOCSIS-based configuration information comprises an identifier (ID) of a service flow, and wherein the converting of the DOCSIS-based configuration information into PON-based configuration information comprises:
   converting, by the ONU/ONT, the ID of the service flow into an ID of a Transport Container (T-CONT).

3. The method of claim 1, wherein the DOCSIS-based configuration information comprises an identifier (ID) of a service flow, and wherein the converting of DOCSIS-based configuration information into PON-based configuration information comprises:
   converting, by the ONU/ONT, the ID of the service flow into an ID of a logical link.

4. The method of claim 1, wherein;
   DOCSIS-based configuration information comprises service type information of a service flow, the service type information of the service flow corresponding to one of an Unsolicited Grant Service (UGS), an Unsolicited Grant Service with Activity Detection (UGS-AD), a Real-Time Polling Service (Rt-Polling), and a Non-Real-Time Polling Service (Nrt-Polling);
   wherein the converting of the DOCSIS-based configuration information into the PON-based configuration information further comprises:
   if the service type information of the service flow corresponds to the UGS or UGS-AD, converting, by the ONU/ONT, the service type information of the service flow into PON protocol information corresponding to a fixed bandwidth;
   if the service type information of the service flow corresponds to the Rt-Polling, converting, by the ONU/ONT, the service type information of the service flow into PON protocol information corresponding to an assured bandwidth; and
   if the service type information of the service flow corresponds to the Nrt-Polling, converting, by the ONU/ONT, the service type information of the service flow into PON protocol information corresponding to a non-assured bandwidth or best-effort delivery.

5. The method of claim 4, further comprising:
   reporting, by the ONU/ONT, after switching the working mode to the virtual CM mode, a working mode switching result to the OLT so as to request the OLT to configure a service channel according to the working mode switching result; and
   wherein the service channel is provided for the ONU/ONT to obtain the DOCSIS-based configuration information.

6. The method of claim 5, wherein the obtaining of the DOCSIS-based information comprising:
   sending, by the ONU/ONT, a first request message to a Dynamic Host Configuration Protocol (DHCP) server of the OSS through the service channel to obtain network address information;
   sending, by the ONU/ONT, a second request message to a Time of Day (ToD) server of the OSS through the service channel to obtain current time information; and
   sending, by the ONU/ONT, a third request message to a Trivial File Transfer Protocol (TFTP) server of the OSS through the service channel to request downloading of the first configuration information.

7. The method of claim 1, wherein the virtual mode switching notification message is an extended Operation, Administration and Maintenance (OAM) message, and the extended OAM message comprises a field providing instruction of switching a working mode to a virtual CM mode.

8. The method of claim 1, wherein the virtual mode switching notification message is an extended ONU Management and Control Interface (OMCI) message, the extended OMCI message comprises a virtual CM attribute in an ONT-G management entity, and the virtual CM attribute is configured to provide instruction of switching a working mode to a virtual CM mode.

9. The method of claim 1, wherein the switching of the working mode to a virtual Cable Modem (CM) mode comprises:
   determining by the ONU/ONT, whether a virtual CM mode corresponding to a DOCSIS protocol can be supported;
   if the virtual CM mode is supported, switching by the ONU/ONT, a current working mode from a normal ONT/ONU mode corresponding to a PON protocol to the virtual CM mode; and
   after switching to the virtual CM mode, simulating by the ONU/ONT, a virtual cable modem of a DOCSIS network and implementing DOCSIS services process.

10. The method of claim 8, wherein the switching of the working mode to a virtual Cable Modem (CM) mode further comprises:
    if the virtual CM mode is not supported, providing by the ONU/ONT, a message indicating that the virtual CM mode cannot be supported to the OLT.

11. The method of claim 1, wherein the converting of the DOCSIS-based configuration information into the PON-based configuration information comprises:
    converting by the ONU/ONT, the DOCSIS-based configuration information into a PON-based configuration information according to a conversion relation between a DOCSIS protocol and a GPON protocol;
    wherein an ID of service flow in the DOCSIS-based configuration information is converted to a Transport Container ID (T-CONT ID) corresponding to the GPON protocol; and
    a service type of uplink service flow in the DOCSIS-based configuration is converted to a corresponding one of bandwidth management types comprising fixed bandwidth, assured bandwidth, non-assured bandwidth, and best-effort delivery.

12. The method of claim 1, wherein the converting of the DOCSIS-based configuration information into the PON-based configuration information comprises:
    converting by the ONU/ONT, the DOCSIS-based configuration information into a PON-based configuration information according to a conversion relation between a DOCSIS protocol and an EPON protocol;
    wherein an ID of service flow in the DOCSIS-based configuration information is converted to a Logical Link ID (LLID) corresponding to the EPON protocol; and
    a service type of uplink service flow in the DOCSIS-based configuration is converted to a corresponding one of bandwidth management types comprising fixed bandwidth, assured bandwidth, non-assured bandwidth, and best-effort delivery.

13. A service configuration conversion apparatus implementing in a Data Over Cable Service Interface Specifications over Passive Optical Network (DOCSIS-over-PON) system, comprising:
    a switching module, configured to switch a working mode to a virtual Cable Modem (CM) mode according to a virtual mode switching notification message directly sent by an Optical Line Terminal (OLT);
    an obtaining module, configured to obtain DOCSIS-based configuration information directly from an Operations Support System (OSS);
    a converting module, configured to convert the DOCSIS-based configuration information into PON-based configuration information according to a predetermined conversion relation between a DOCSIS protocol and a PON protocol, and implement parameter configuration for the service configuration conversion apparatus according to the PON-based configuration information; and
    a sending module, configured to send a configuration complete message directly to the OLT after the configuration is complete;
    wherein the switching module, the obtaining module, the converting module and the sending module are configured in an Optical Network Unit or Optical Network Terminal (ONU/ONT).

14. The apparatus of claim 13, wherein the DOCSIS-based configuration information comprises an ID of a service flow, and service type information of the service flow.

15. The apparatus of claim 14, further comprising:
    a reporting module, configured to report a working mode switching result to the OLT, so as to request the OLT to configure a service channel according to the working mode switching result; and
    wherein the service channel is provided for the service configuration conversion apparatus to obtain the DOCSIS-based configuration information, the reporting module is configured in the ONU/ONT.

16. The apparatus of claim 15, wherein the obtaining module comprises:
    a first obtaining unit, configured to send a first request message to a Dynamic Host Configuration Protocol (DHCP) server of the OSS through the service channel to obtain network address information;
    a second obtaining unit, configured to send a second request message to a Time of Day (ToD) server of the OSS through the service channel to obtain current time information; and
    a third obtaining unit, configured to send a third request message to a Trivial File Transfer Protocol (TFTP) server of the OSS through the service channel to request downloading of the DOCSIS-based configuration information.

17. The apparatus of claim 14, wherein the converting module converts the ID of service flow in the DOCSIS-based configuration information to a Transport Container ID (T-CONT ID) corresponding to a GPON protocol.

18. The apparatus of claim 14, wherein the converting module converts the ID of service flow in the DOCSIS-based configuration information to a Logical Link ID (LLID) corresponding to an EPON protocol.

19. The apparatus of claim 14, wherein the service type information of the service flow comprises DOCSIS-protocol information indicating one of an Unsolicited Grant Service (UGS), an Unsolicited Grant Service with Activity Detection (UGS-AD), a Real-Time Polling Service (Rt-Polling), and a Non-Real-Time Polling Service (Nrt-Polling);
    wherein the converting module converts the DOCSIS-protocol information indicating the UGS and the UGS-AD to PON protocol information corresponding to a fixed bandwidth, converts the DOCSIS-protocol information indicating the Rt-Polling to PON protocol information corresponding to an assured bandwidth, and converts the DOCSIS-protocol information indicating the Nrt-Polling to PON protocol information corresponding to a non-assured bandwidth or best-effort delivery.

20. An apparatus, comprises:
a processor in an Optical Network Unit or Optical network Terminal (ONU/ONT), the processor is configured to implement service configuration conversion in a DOCSIS-over-PON system, the service configuration conversion implementation comprising:
  switching a working mode of the ONU/ONT to a virtual Cable Modem (CM) mode according to a virtual mode switching notification message sent directly by an Optical Line Terminal (OLT);
  obtaining DOCSIS-based configuration information directly from an Operations Support System (OSS);
  converting the DOCSIS-based configuration information into PON-based configuration information; and
  implementing parameter configuration of the ONU/ONT according to the PON-based configuration information.

* * * * *